United States Patent
Moran et al.

(10) Patent No.: US 9,094,492 B2
(45) Date of Patent: Jul. 28, 2015

(54) COOPERATIVE TABLET COMPUTER AND MOBILE COMMUNICATOR

(75) Inventors: Dov Moran, Kfar Saba (IL); Itay Sherman, Hod Hasharon (IL); Orlee Tal, Tel Aviv (IL); Ayelet Shadmi-Barzilay, Kafar Saba (IL); Uri Ron, Kfar Saba (IL)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 13/819,323

(22) PCT Filed: Nov. 16, 2011

(86) PCT No.: PCT/IL2011/000887
§ 371 (c)(1),
(2), (4) Date: Feb. 26, 2013

(87) PCT Pub. No.: WO2012/066544
PCT Pub. Date: May 24, 2012

(65) Prior Publication Data
US 2013/0225139 A1    Aug. 29, 2013

Related U.S. Application Data

(60) Continuation-in-part of application No. 13/471,751, filed on May 15, 2012, now Pat. No. 8,391,921, which is a continuation of application No. 12/525,820, filed as application No. PCT/IL2008/000164 on Feb. 6, (Continued)

(51) Int. Cl.
*H04M 1/02* (2006.01)
*H04M 1/725* (2006.01)

(52) U.S. Cl.
CPC .......... *H04M 1/0256* (2013.01); *H04M 1/7253* (2013.01); *H04M 2250/16* (2013.01)

(58) Field of Classification Search
CPC ........... H04M 1/0256; H04M 1/7253; H04M 2250/16
USPC ....................................... 455/415
See application file for complete search history.

(56) References Cited

U.S. PATENT DOCUMENTS

| | | | |
|---|---|---|---|
| 8,797,268 B2* | 8/2014 | Altman et al. | 345/169 |
| 8,826,159 B2* | 9/2014 | Nurmi | 715/764 |
| 8,838,152 B2* | 9/2014 | Tang et al. | 455/456.6 |
| 2009/0042508 A1* | 2/2009 | Wakasa et al. | 455/3.06 |
| 2009/0136013 A1* | 5/2009 | Kuykendall et al. | 379/142.17 |

(Continued)

*Primary Examiner* — Qun Shen
(74) *Attorney, Agent, or Firm* — Soquel Group LLC

(57) ABSTRACT

A communication system, including a mobile communicator including a modem for conducting a communication with a remote party, an input unit for inputting communication data to the modem, and an output for outputting communication data from the modem, a display device including an input unit, an output unit, a connector for engaging the mobile communicator and for exchanging data with the mobile communicator, and a display for displaying party-specific information about the remote party involved in the communication, wherein the modem switches to receive its communication input via the display device input unit and directs its communication output to the display output unit when the mobile communicator is engaged with the connector, and wherein the modem switches back to receive its communication input via the mobile communicator input unit and directs its communication output to the mobile communicator output unit when the mobile communicator is disengaged from the connector.

26 Claims, 5 Drawing Sheets

Related U.S. Application Data 2008, now Pat. No. 8,180,395, application No. 13/819,323, which is a continuation-in-part of application No. 13/564,728, filed on Aug. 2, 2012, now Pat. No. 8,892,164, which is a division of application No. 12/151,079, filed on May 3, 2008, now Pat. No. 8,260,348, application No. 13/819,323, which is a continuation-in-part of application No. 12/415,116, filed on Mar. 31, 2009, now Pat. No. 8,868,075.

(60) Provisional application No. 61/413,990, filed on Nov. 16, 2010, provisional application No. 61/069,987, filed on Mar. 19, 2008, provisional application No. 61/043,179, filed on Apr. 8, 2008.

(56) References Cited

U.S. PATENT DOCUMENTS

| | | | |
|---|---|---|---|
| 2010/0079355 A1* | 4/2010 | Kilpatrick et al. | 345/1.3 |
| 2010/0081385 A1* | 4/2010 | Lin et al. | 455/41.3 |
| 2010/0093401 A1* | 4/2010 | Moran et al. | 455/566 |
| 2010/0157978 A1* | 6/2010 | Robbins et al. | 370/352 |
| 2010/0235425 A1* | 9/2010 | Holden et al. | 709/202 |
| 2011/0111696 A1* | 5/2011 | Lazaridis | 455/41.2 |

* cited by examiner

COOPERATIVE TABLET COMPUTER AND MOBILE COMMUNICATOR

CROSS REFERENCES TO RELATED APPLICATIONS

This application is a national phase entry of international application PCT/IL2011/000887, entitled COOPERATIVE TABLET COMPUTER AND MOBILE COMMUNICATOR, filed on Nov. 16, 2011 by inventors Dov Moran, Itay Sherman, Orlee Tal, Ayelet Shadmi-Barzilay and Uri Ron. PCT/IL2011/000887 claims benefit of U.S. Provisional Application No. 61/413,990, entitled COOPERATIVE PAD COMPUTER AND MOBILE COMMUNICATOR, filed on Nov. 16, 2010 by inventors Dov Moran, Itay Sherman, Orlee Tal, Ayelet Shadmi-Barzilay and Uri Ron.

This application is a continuation-in-part of assignee's U.S. Ser. No. 13/471,751, now U.S. Pat. No. 8,391,921, entitled MODULAR WIRELESS COMMUNICATOR, filed on May 15, 2012 by inventors Dov Moran, Itay Sherman, Eyal Bychkov, Itay Cohen, Yaron Segalov, Tamir Demri, Eran Miller, Uri Ron, Tal Engelstein, Hagay Katz and Hagit Perry. U.S. Ser. No. 13/471,751 is a continuation of U.S. Ser. No. 12/525,820, now U.S. Pat. No. 8,180,395, entitled MODULAR WIRELESS COMMUNICATOR, filed on Aug. 5, 2009 by inventors Dov Moran, Itay Sherman, Eyal Bychkov, Itay Cohen, Yaron Segalov, Tamir Demri, Eran Miller, Uri Ron, Tal Engelstein, Hagay Katz and Hagit Perry. U.S. Ser. No. 12/525,820 is a national phase entry of PCT/IL2008/000164, entitled MODULAR WIRELESS COMMUNICATOR, filed on Feb. 6, 2008 by inventors Dov Moran, Itay Sherman, Eyal Bychkov, Itay Cohen, Yaron Segalov, Tamir Demri, Eran Miller, Uri Ron, Tal Engelstein, Hagay Katz and Hagit Perry.

This application is a continuation-in-part of U.S. Ser. No. 13/564,728, now U.S. Pat. No. 8,892,164, entitled MODULAR CELL PHONE FOR LAPTOP COMPUTERS, filed on Aug. 2, 2012 by inventor Itay Sherman. U.S. Ser. No. 13/564,728 is a divisional of U.S. Ser. No. 12/151,079, now U.S. Pat. No. 8,260,348, filed on May 3, 2008 by inventor Itay Sherman, entitled MODULAR CELL PHONE FOR LAPTOP COMPUTERS, which claims priority from provisional application U.S. Ser. No. 61/069,987, filed on Mar. 19, 2008 by inventor Itay Sherman, entitled MODULAR CELL PHONE FOR LAPTOP COMPUTERS.

This application is a continuation-in-part of U.S. Ser. No. 12/415,116, now U.S. Pat. No. 8,868,075, filed on Mar. 31, 2009 by inventors Itay Sherman, Eyal Bychkov and Uri Ron, entitled MODULAR CELL PHONE FOR FIXED MOBILE CONVERGENCE, which claims priority from provisional application U.S. Ser. No. 61/043,179, filed on Apr. 8, 2008 by inventors Itay Sherman, Eyal Bychkov and Uri Ron, entitled MODULAR CELL PHONE FOR FIXED MOBILE CONVERGENCE.

FIELD OF THE INVENTION

The field of the present invention is mobile computers and mobile phones.

BACKGROUND OF THE INVENTION

It appears that tablet computers and pad-like computers are going to become the primary media players, e-mail applications, e-book readers, Internet browsers, gaming devices and digital picture frames of the masses of mobile consumers, to accompany them wherever they go. Additionally, mobile consumers carry their cell phones with them.

As such, the issue arises of how to best design two mobile devices, a tablet and a phone, each of which has wireless communication capability. If a consumer's tablet is 3G connected, then he must use two SIMs, one for his tablet and one for his phone, and pay for two phone numbers. If the consumer's tablet is Wi-Fi only, and the consumer wants to connect his tablet to the Internet via a 3G connection, in the absence of a Wi-Fi connection, then such connection requires that his phone have tethering capability, and such use draws considerable battery power from the phone, thus providing only a short-term connection. Moreover, the consumer must constantly charge his two mobile devices.

Thus it would be of advantage to design a tablet+phone combination for efficient cooperative use.

SUMMARY OF THE DESCRIPTION

Aspects of the present invention relate to a tablet+phone combination, designed for shared communication and power resources, and cooperative applications therefor.

The phone connects to and detaches from the tablet. When the phone is connected to the tablet, the phone and tablet share resources cooperatively. The tablet charges the phone's battery. The tablet and phone synchronize their data files, including inter alia log files, SMS files and media files. A user can operate the phone via the tablet; he can dial, chat, send SMS messages, send e-mail messages, and browse the Internet, via the phone, using the tablet. Moreover, when the user initiates a phone call from the tablet, he can detach the phone from the tablet at any time, and continue the call uninterruptedly on the phone.

In one embodiment of the present invention, the phone is a tiny, light, low cost phone with an MP3 player and a camera, and having a form factor that is relatively long and narrow. The phone has a simple battery with a battery life that supports approximately two hours of talk time. The tablet is Android-based with Wi-Fi communication, without a radio and without a SIM card. The tablet has a large battery. The tablet and phone connect via a physical connector, such as a three-pin USB connector, and/or via a Bluetooth connector. A button enables quick detachment of the phone from the tablet.

The phone and tablet run cooperative applications. In one embodiment of the present invention, when the phone is in communication with a remote party, the tablet retrieves and displays information about the remote party. Information about the remote party includes inter alia personal information retrieved from a local data store in the tablet and/or in the phone, personal information retrieved from social networks, personal information retrieved by search services, business information retrieved from business sources, information from recent communications with the remote party, calendar information for events related to the remote party, and geographical information about the location and whereabouts of the remote party.

There is thus provided in accordance with an embodiment of the present invention a communication system, including a mobile communicator including a modem for conducting a communication with a remote party, an input unit for inputting communication data to the modem, and an output for outputting communication data from the modem, a display device coupled with the mobile communicator, including an input unit, an output unit, a connector for engaging the mobile communicator and for exchanging data with the mobile communicator, and a display for displaying the party-specific information about the remote party involved in the communication, wherein the modem switches to receive its communication input via the display device input unit and directs its communication output to the display output unit when the mobile communicator is engaged with the connector, and wherein the modem switches back to receive its communication input via the mobile communicator input unit and directs its communication output to the mobile communicator output unit when the mobile communicator is disengaged from the connector after being engaged therewith.

There is additionally provided in accordance with an embodiment of the present invention a method of communication, including receiving, by a display device coupled with a mobile communicator, and from the mobile communicator, an identifier of a remote party of a communication conducted by the mobile communicator, retrieving party-specific information about the remote party of the communication; and displaying, by the display device, the retrieved information.

There is further provided in accordance with an embodiment of the present invention a display apparatus for a mobile communicator, including an adapter for exchanging data with a mobile communicator, the data including a designation of a remote party involved in a communication with the mobile communicator, a retriever for retrieving party-specific information about the designated remote party from one or more social networks of which the designated remote party is a member, and a display for displaying the party-specific information obtained from said retriever about the designated remote party.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a mobile tablet computer and mobile communicator that share resources and run cooperative applications.

Figure 1:
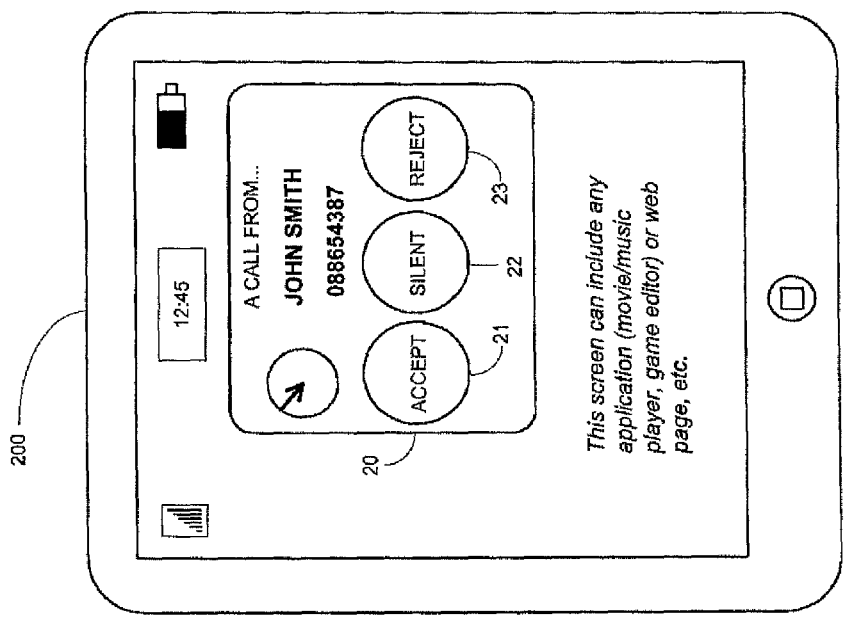
FIG. 1 is an illustration of a display device coupled with a wireless communicator, when the wireless communicator receives an incoming call, in accordance with an embodiment of the present invention.
Figure 1:
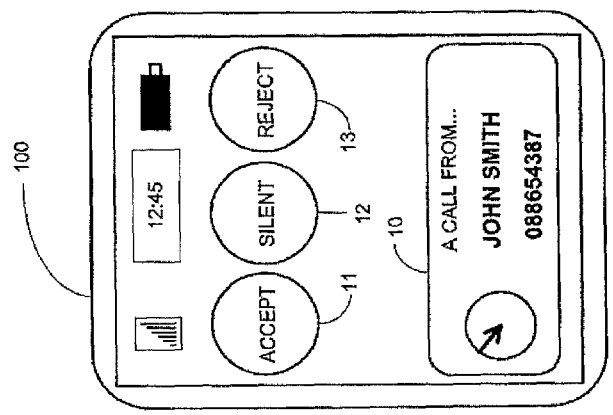

Reference is made to FIG. 1, which is an illustration of a display device 200 coupled with a wireless communicator 100, when wireless communicator 100 receives an incoming call, in accordance with an embodiment of the present invention. Display device 200 may be inter alia a tablet computer or a pad-like computer.

As shown in FIG. 1, when an incoming call is received on wireless communicator 100, respective notifications 10 and 20 are displayed on wireless communicator 100 and on display device 200. In addition, respective controls 11, 12 and 13 are provided on wireless communicator 100 to accept the call, silence the ringing, or reject the call; and similar respective controls 21, 22 and 23 are provided on display device 200. Accordingly, the incoming call may be answered using wireless communicator 100, or using display device 200.

In accordance with an embodiment of the present invention, if display device 200 is in a sleep mode, or such other low power mode, when the incoming call is received, then wireless communicator 100 sends a prompt to wake up display device 200, and display device 200 switches to normal power mode.

Figure 2:
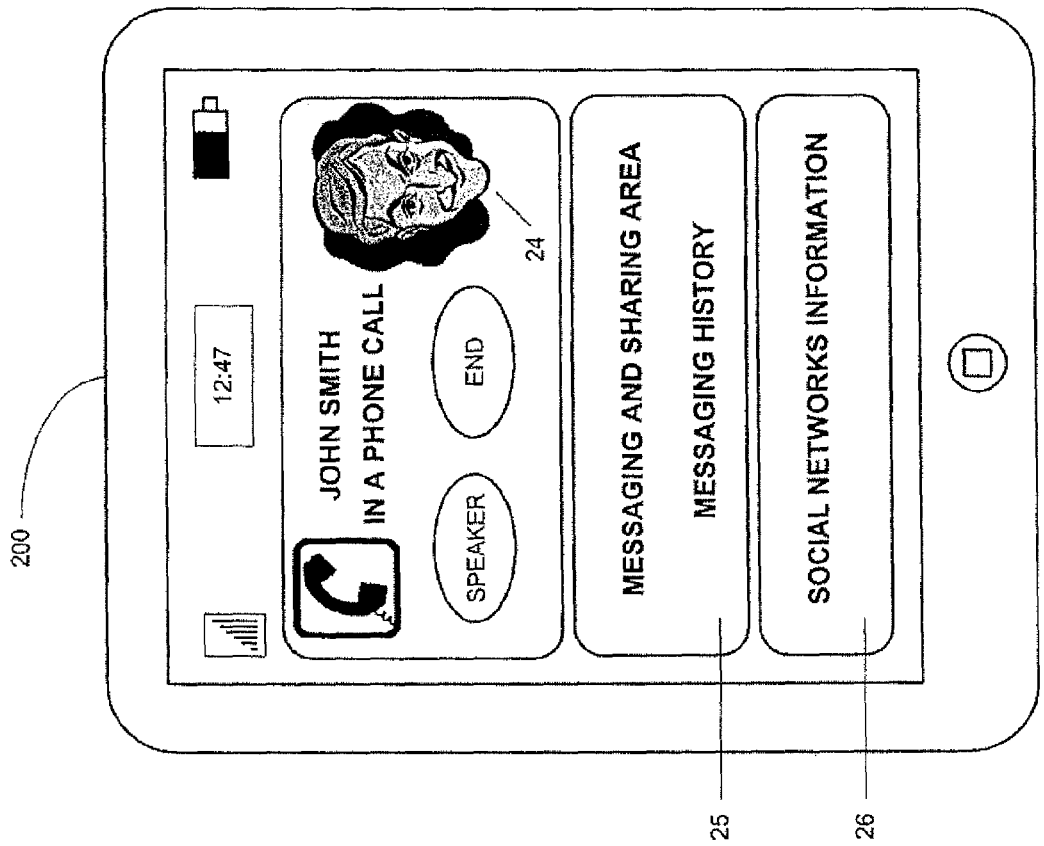
FIG. 2 is an illustration of a user interface of the display device of FIG. 1, as it is retrieving information about a remote party in communication with the wireless communicator of FIG. 1, in accordance with an embodiment of the present invention.
Figure 2:
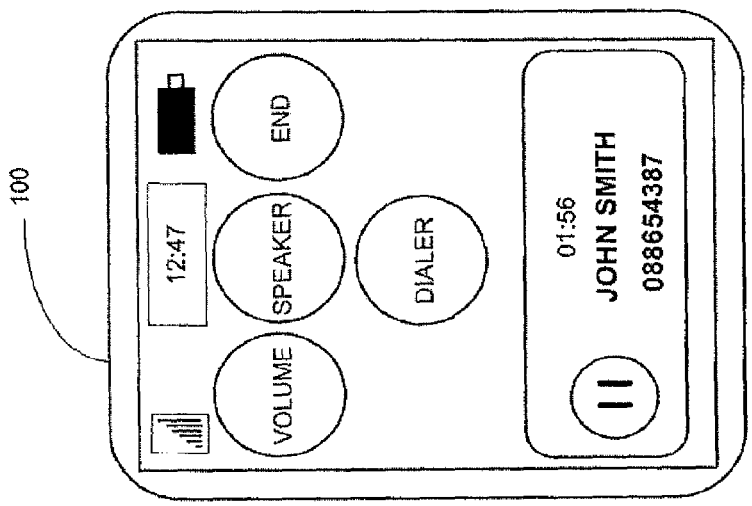

Reference is made to FIG. 2, which is an illustration of a user interface of display device 200, as it is retrieving information about a remote party in communication with wireless communicator 100, in accordance with an embodiment of the present invention. Shown in FIG. 2 is a photo 24 of the remote party, a messaging area 25, and a social networks area 26. Generally, messaging area 25 is used to chat with the remote party. Messaging area 25 displays previous chats and messages with the remote party. The previous chats displayed in messaging area 25 may include inter alia previous chats via one or more different social networks. The previous messages displayed in messaging area 25 may include inter alia previous SMS messages, previous MMS messages and previous e-mail messages.

Generally, social networks area 26 displays information such as status updates. In one embodiment of the present invention, there may be separate social network areas for each social network, and a user selects which of the various social network areas are to be prepared and displayed by the user interface.

Figure 3:
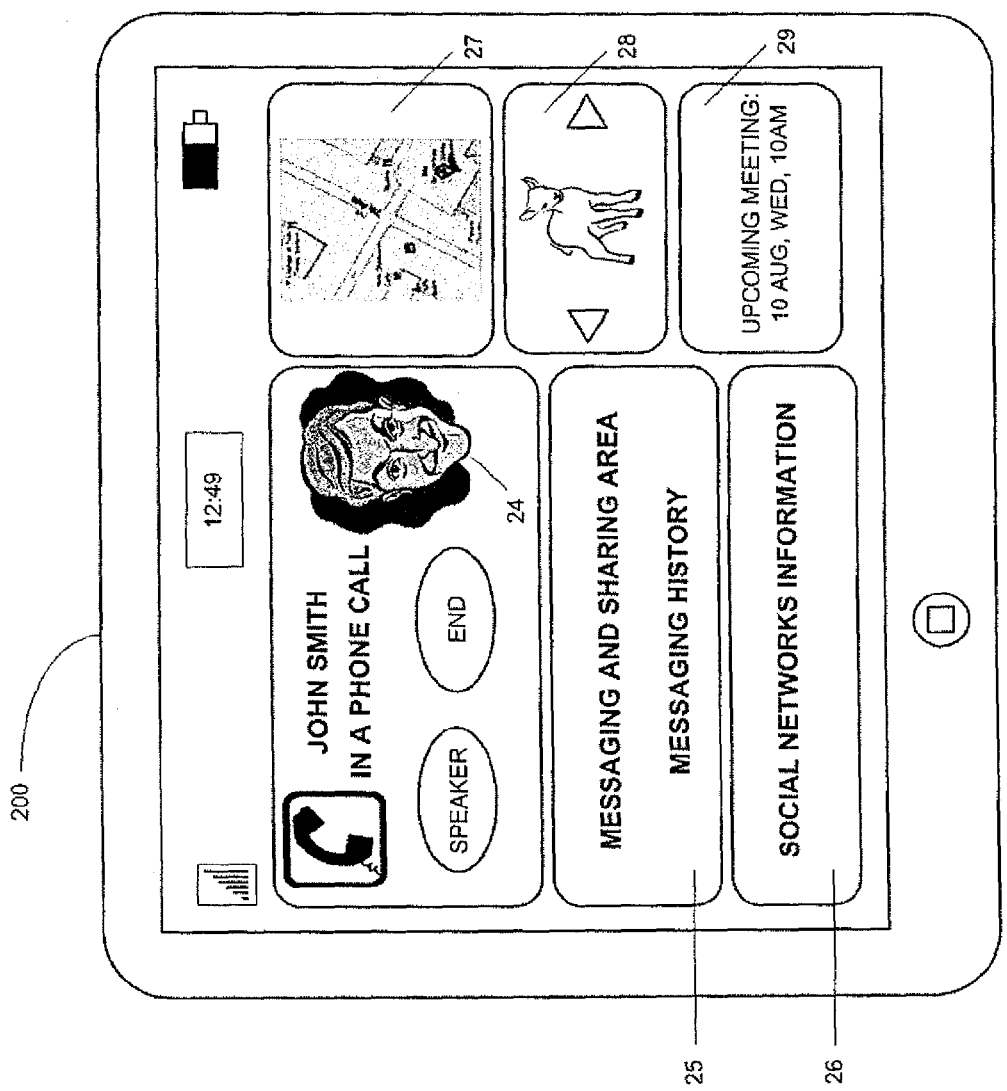
FIG. 3 is an illustration of a user interface of the display device of FIG. 1, as it is displaying a profile, and a wide range of retrieved information about a remote party, for a remote party in communication with the wireless communicator of FIG. 1, in accordance with an embodiment of the present invention.
Figure 3:
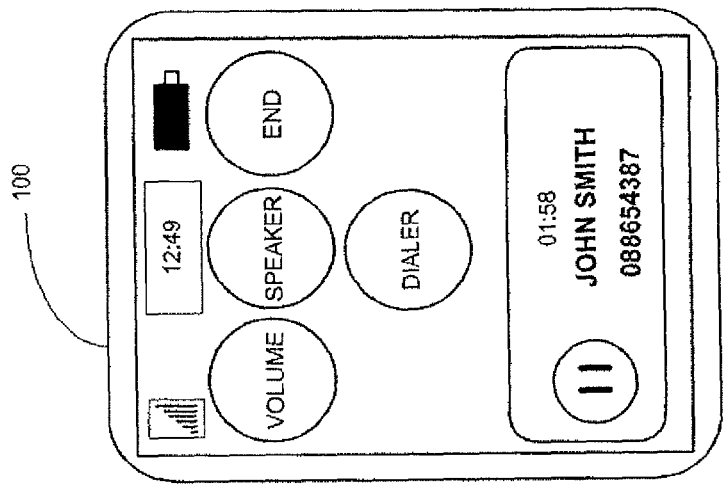

Reference is made to FIG. 3, which is an illustration of the user interface of display device 200, as it is displaying a profile, and a wide range of retrieved information about a remote party, for the remote party in communication with wireless communicator 100, in accordance with an embodiment of the present invention. The user interface includes a map 27, showing the location of the remote party. The user interface also includes images 28, from a gallery of images, which have tags related to the remote party. The user interface also includes calendar events 29 related to the remote party.

Generally, the information about the remote party displayed by the user interface may include local information stored on display device 200, local information stored on wireless communicator 100, and remote information retrieved from sources on the Internet. Local information may include inter alia contact information for the remote party, calendar information about events associated with the remote party, and recent communications with the remote party. Remote information may include inter alia social network information from social networks, business-related information from business web sites or databases, web search information from Internet search services, and geographical location information.

In accordance with an embodiment of the present invention, the information about the remote party displayed by the user interface may be configured according to user preferences. Moreover, the configuration may also specify the layout and positioning of the various information panels, such as panels 25, 26, 27, 28 and 29 of FIG. 3. Moreover, the configuration may be remote party specific. E.g., for a designated remote party, A, the information to be displayed is recent phone calls with A, and A's status; and for a designated remote party, B, the information to be displayed is presence information for B, and recent email messages with B.

Moreover, in accordance with an embodiment of the present invention, the configuration information may be communication protocol specific. E.g., for voice communication with A, the information to be displayed is recent phone calls with A, and A's geographical location; and for chat communication with A, the information to be displayed is recent chat sessions with A, and calendar events relating to A.

Moreover, in accordance with an embodiment of the present invention, the configuration may distinguish between different identifiers of the same remote party. E.g., if a phone call is received from a home number, the information to be displayed is social network information, and if a phone call is received from a business number, the information to be displayed is business information.

Figure 4:
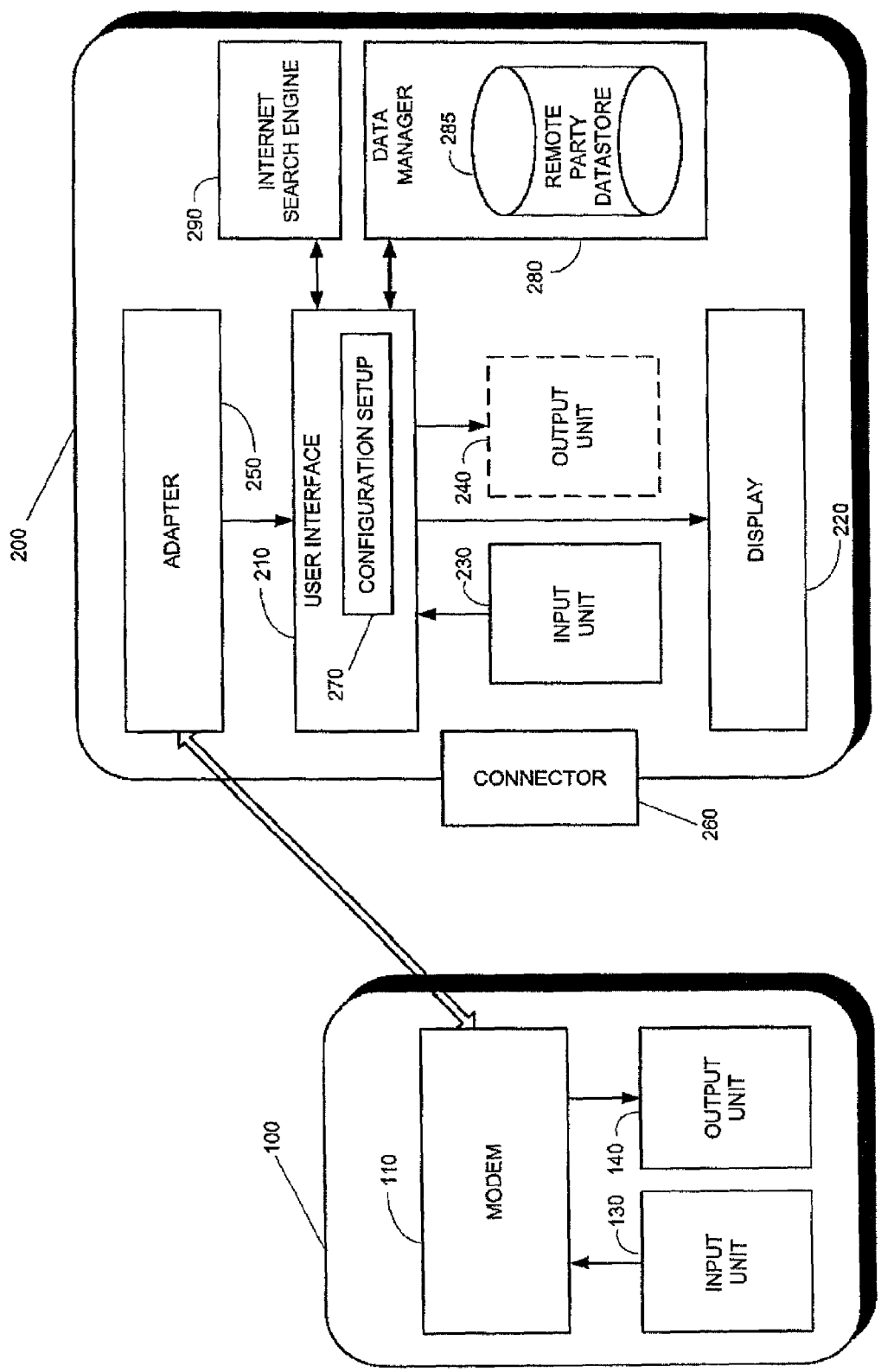
FIG. 4 is a simplified block diagram of a mobile communicator with a coupled display device, in accordance with an embodiment of the present invention.

Reference is made to FIG. 4, which is a simplified block diagram of mobile communicator 100 with coupled display device 200, in accordance with an embodiment of the present invention. Mobile communicator 100 includes a modem 110 for communication with a remote party, an input unit 130 for inputting communication data to modem 100, and an output unit 140 for outputting communication data from modem 110.

Generally, mobile communicator 100 is a tiny light device, whose form factor is relatively long and narrow. In one embodiment of the present invention, mobile communicator 100 is a low cost 3.5G phone with an MP3 player and a camera. Mobile communicator 100 has a touch display that enables dialing via phone numbers or log or contact list, and that enables reading SMS messages. Mobile communicator 100 has a battery, with a battery life that enables approximately two hours of talk time.

Mobile communicator 110 may be inter alia a cellular telephone, a voice-over-IP (VoIP) telephone, a messaging communicator, or a combination thereof, such as a combined cellular/VoIP communicator. When mobile communicator 100 is a cellular telephone or voice-over-IP telephone, input unit 130 is generally a small microphone, and output unit 140 is generally a small speaker, or a pair of small stereo speakers. When modem 100 is a messaging communicator, input unit 130 is generally a small message editor such as a keypad or touch screen, and output unit 140 is generally a small display. In other embodiments of the present invention, input unit 130 may be a camera or a sensor, and output unit 140 may be a vibrator or a light source, such as an LED light. In accordance with one embodiment of the present invention, modem 100 supports multiple communication protocols, including inter alia e-mail communication, chat, SMS communication and MMS communication.

Display device 200 includes a user interface 210 for presenting party-specific information about the remote party that modem 110 is communicating with, such as the information shown in FIG. 3, a display 220 for displaying the party-specific information that is presented by user interface 210, an input unit 230 for inputting data to user interface 210, an output unit 240 for outputting data from user interface 210, an adapter 250 for exchanging data with mobile communicator 100, a connector 260 for engaging mobile communicator 100, a data manager 280 for managing a remote party data store 285 that stores data regarding a plurality of remote parties, and an Internet search engine 290 for retrieving party-specific information from the Internet.

Generally, display device 200 is a tablet or a pad-like computer, functional by itself without mobile communicator 100. In one embodiment of the present invention, display device 200 is Android-based, without a radio and without a SIM card. Display device 200 has a local storage on the order of tens of gigabytes, and a large battery.

Input unit 230 may be a microphone or a message editor, such as a keypad or touch screen. Output unit 240 may be a speaker, or a pair of stereo speakers. Alternatively, output unit 240 may be the same display as display 220. In other embodiments of the present invention, input unit 230 may be a camera or a sensor, and output unit 240 may be a vibrator or a light source, such as an LED light.

In one embodiment of the present invention, connector 260 is a USB connector. In another embodiment of the present invention, connector 260 is a three-pin connector. Alternatively, connector 260 may be a Bluetooth connector. A button enables quick detachment of mobile communicator 100 from connector 260.

When mobile communicator 100 is attached to connector 260, mobile communicator 100 and display device 200 share resources and cooperate productively in many ways. When mobile communicator 100 is attached to connector 260, modem 110 receives its input communication data from input unit 230 instead of from input unit 130, or alternatively from both input units 130 and 230, and directs its output communication data to output unit 240 instead of to, or alternatively in addition to, output unit 140. When mobile communicator is subsequently detached from connector 260, modem 110 transparently switches to receive its input communication data from input unit 130 and directs its output communication data to output unit 140. Mobile communicator 100 can also continue to receive input data wirelessly from input unit 230.

When mobile communicator 100 is attached to connector 260, the battery of mobile communicator 100 is charged by display device 200. Mobile communicator 100 and display device 200 automatically synchronize their data, including log files, SMS files and media files. A user may copy songs from mobile communicator 100 to display device 200. The user may operate mobile communicator 100 from display device 200. The user may dial a phone number, send an SMS message or an e-mail message, and browse the Internet, via modem 110, all from display device 200. During a phone call, the user can detach mobile communicator 100 from connector 260, and continue the call uninterruptedly from mobile communicator 100.

Data store 285 may store personal data relating to remote parties, and data relating to recent communications with remote parties. Data store 285 may store calendar information relating to meetings and other events with remote parties, special dates relating to remote parties including inter alia birthdays and wedding anniversaries, and contact information and business cards for remote parties.

User interface 210 includes a configuration setup 270, through which a user designates the types of information that he wishes user interface 210 to present. Configuration setup 270 is very flexible, and allows the user to designate the types of information to be presented on a per-remote-party basis and on a per-communication-protocol basis. I.e., the user can designate that certain types of information are to be presented for one remote party, and other types of information are to be presented for another remote party. Similarly, the user can designate that certain types of information are to be presented for e-mail communication, and other types of information are to be presented for chat communication.

Moreover, the same remote party may have more than one identifier, such as an identifier for home and an identifier for work. In such case, configuration setup 270 allows the user to designate the types of information to be presented on a per-remote-party-identifier basis. Thus the user can designate that certain types of information are to be presented for communication with the remote party at home, and other types of information are to be presented for communication with the remote party at work.

Figure 5:
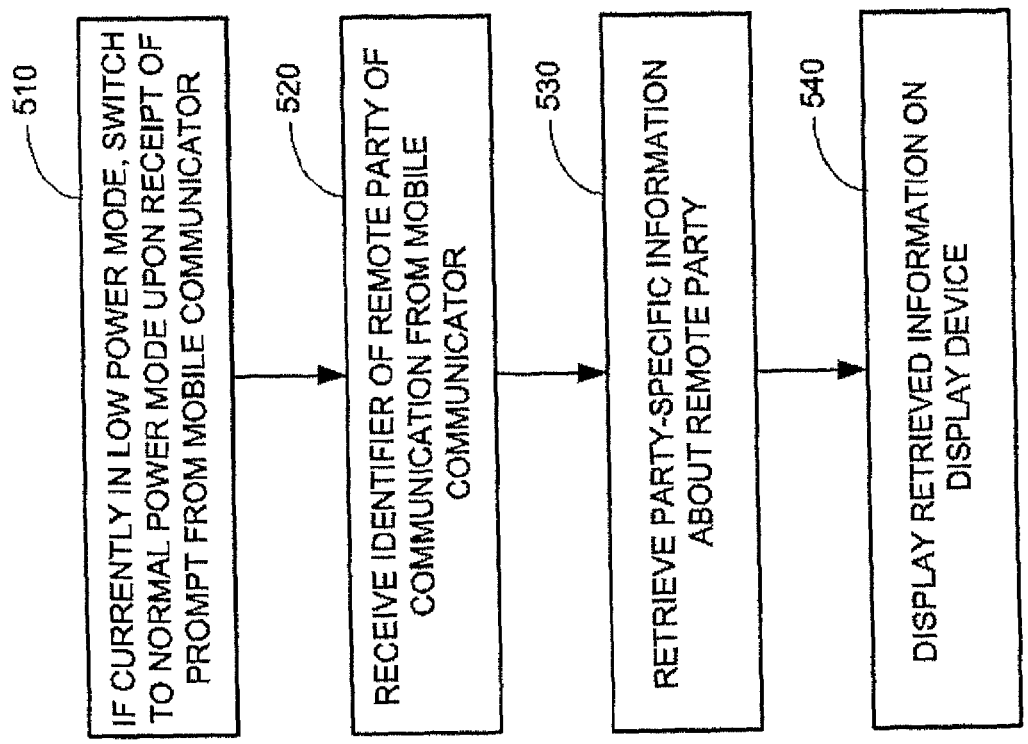
FIG. 5 is a simplified flowchart of a method for a display device coupled with a mobile communicator, in accordance with an embodiment of the present invention.

Reference is made to FIG. 5, which is a simplified flowchart of a method for a display device, such as display device 200, coupled with a mobile communicator, such as mobile communicator 100, in accordance with an embodiment of the present invention. If the display device is currently in a sleep mode, or such other low power mode, then at step 510, upon initialization of communication by the mobile communicator with a remote party, the display device receives a wake-up prompt from the mobile communicator, and switches to normal power mode.

At step 520 the display device receives, from the mobile communicator, an identifier of the remote party with whom the mobile communicator is communicating.

At step 530 the display device retrieves information specific to the remote party. The display device may retrieve some or all of its information from a local data store, such as data store 285, or from the Internet using an Internet search engine such as search engine 290. Internet search engine 290 may inter alia retrieve personal data from social networks that the remote party belongs to.

At step 540 the display device renders the retrieved information for presentation on its display.

In reading the above description, persons skilled in the art will realize that there are many apparent variations that can be applied to the methods and systems described. Thus it may be appreciated that wireless communicator 100, instead of or in addition to display device 200, may include its own data manager and data store, similar to respective elements 280 and 285 of display device 200. In such case, display device 200 retrieves some or all of the party-specific information from mobile communicator 100.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication system, comprising:
   a mobile communicator comprising:
      a modem for conducting a communication with a remote party;
      an input unit for inputting communication data to said modem; and
      an output for outputting communication data from said modem;
   a display device coupled with said mobile communicator, comprising:
      an input unit;
      an output unit;
      a connector for engaging said mobile communicator and for exchanging data with said mobile communicator, the data including a designation of a remote party involved in a communication with the mobile communicator; and
      a display for presenting party-specific information about the remote party involved in the communication, the party-specific information including one or more types of information from the group consisting of (a) personal information regarding the remote party, (b) business information regarding the remote party, (c) information regarding recent communications with the remote party, (d) calendar information regarding events related to the remote party, and (e) geographical information regarding the remote party; and
      a configuration setup, through which a user selects one or more of the multiple types of information to be presented as the party-specific information on said display,
   wherein said modem switches to receive its communication input via said display device input unit and directs its communication output to said display output unit when said mobile communicator is engaged with said connector, and
   wherein said modem switches back to receive its communication input via said mobile communicator input unit and directs its communication output to said mobile communicator output unit when said mobile communicator is disengaged from said connector after being engaged therewith.

2. The communication system of claim 1 wherein the communication with the remote party is a voice conversation, wherein said mobile communicator input unit is a small microphone, wherein said mobile communicator output unit is a small speaker, wherein said display device input unit is a microphone, and wherein said display device output is a speaker.

3. The communication system of claim 1 wherein the communication with the remote party is a messaging communication, wherein said mobile communicator input unit is a small message editor, wherein said mobile communicator output unit is a small display, wherein said display device input unit is a message editor, and wherein said display device output unit is said display device display.

4. The communication system of claim 1 wherein said display device is a tablet computer or a pad-like computer.

5. The communication system of claim 1 wherein said mobile communicator further comprises a data manager for accumulating and storing data regarding a plurality of remote parties, and wherein the party-specific information includes data stored by said data manager regarding the remote party of the communication.

6. The communication system of claim 5 wherein data stored by said data manager includes data about recent communications with the remote party of the communication.

7. The communication system of claim 1 wherein said display device further comprises a data manager for accumulating and storing data regarding a plurality of remote parties, and wherein the party-specific information includes data stored by said data manager regarding the remote party of the communication.

8. The communication system of claim 7 wherein data stored by said data manager includes data about recent communications with the remote party of the communication.

9. The communication system of claim 1 wherein said wireless communicator further comprises an Internet search engine, and wherein the party-specific information includes information retrieved by said Internet search engine about the remote party of the communication.

10. The communication system of claim 9 wherein information retrieved by said Internet search engine includes information about the remote party of the communication from social networks to which the remote party of the communication is a member.

11. The communication system of claim 1 wherein said display device further comprises an Internet search engine, and wherein the party-specific information includes information retrieved by said Internet search engine about the remote party of the communication.

12. The communication system of claim 11 wherein information retrieved by said Internet search engine includes information about the remote party of the communication from social networks to which the remote party of the communication is a member.

13. The communication system of claim 1 wherein said display presents the selected one or more types of information in respective window panels, and wherein said configuration setup specifies the layout and positioning of the respective window panels on said display.

14. The communication system of claim 1 wherein the user, via said configuration setup, designates a plurality of configurations of selected one or more types of information, each configuration corresponding to a different remote party, and wherein said display presents the one or more types of information selected by the configuration corresponding to the remote party of the communication.

15. The communication system of claim 1 wherein the remote party of the communication has a plurality of identifiers, and wherein the user, via said configuration setup, designates a plurality of configurations of selected one or more types of information, each configuration corresponding to a different identifier of the remote party of the communication, and wherein said display presents the one or more types of information selected by the configuration corresponding to the identifier of the remote party of the communication.

16. The communication system of claim 1 wherein said modem is operative to initiate and receive multiple communication protocols comprising one or more of the group consisting of voice communication, e-mail communication, SMS communication and MMS communication.

17. The system of claim 16 wherein the user designates, via said configuration setup, a plurality of configurations of selected one or more types of information, each configuration corresponding to a different communication protocol, and wherein said display presents the one or more types of information selected by the configuration corresponding to the communication protocol used with the remote party to the communication.

18. A method of communication, comprising:
connecting a mobile communicator to a display device;
switching, by the mobile communicator, to receive communication input from the display device, and to direct communication output to the display device;
receiving, by the display device from the mobile communicator, an identifier of a remote party of a communication conducted by the mobile communicator;
selecting, via a configuration setup, by a user, one or more of multiple types of party-specific information about the remote party of the communication, from the group consisting of (a) personal information regarding the remote party, (b) business information regarding the remote party, (c) information regarding recent communications with the remote party, (d) calendar information regarding events related to the remote party, and (e) geographical information regarding the remote party;
retrieving information about the remote party for the one or more selected types;
displaying, by the display device, the retrieved information;
disconnecting the mobile communicator from the display device; and
further switching, by the mobile communicator, to receive communication input from an input of the mobile communicator, and to direct communication output to an output of the mobile communicator.

19. The method of claim 18 wherein said retrieving comprises searching for data in the display device relating to the remote party of the communication.

20. The method of claim 18 wherein said retrieving comprises searching the Internet for social network sites to which the remote party of the communication is a member.

21. The method of claim 18 wherein said displaying comprises displaying the information for the one or more selected types in respective window panels on the display device, and wherein said selecting specifies the layout and positioning of the respective window panels.

22. The method of claim 18 wherein the method further comprises designating a plurality of configurations of selected one or more types of information, each configuration corresponding to a different remote party, and wherein said retrieving retrieves information according to the one or more types of information selected by the configuration that corresponds to the remote party of the communication.

23. The method of claim 18 wherein the remote party of the communication has a plurality of identifiers, wherein the method further comprises designating a plurality of configurations of selected one or more types of information, each configuration corresponding to a different identifier of the remote party of the communication, and wherein said retrieving retrieves information according to the one or more types of information selected by the configuration that corresponds to the identifier received by said receiving.

24. The method of claim 18 wherein the mobile communicator enables a plurality of discussion protocols, comprising one or more of the group consisting of voice discussion, e-mail discussion, SMS discussion and MMS discussion, wherein said receiving also receives an identifier of the protocol of the communication in which the remote party is participating.

25. The method of claim 24 further comprising designating a plurality of configurations of selected one or more types of information, each configuration corresponding to a different communication protocol, and wherein said retrieving retrieves information according to the one or more types of information selected by the configuration that corresponds to the communication protocol being used with the remote party to the communication.

26. The method of claim 18 further comprising switching from a low power mode to a normal power mode upon receipt of a prompt from the mobile communicator.

* * * * *